(12) United States Patent
Zhang et al.

(10) Patent No.: US 8,825,779 B2
(45) Date of Patent: Sep. 2, 2014

(54) SYSTEMS AND METHODS OF REAL-TIME DATA SUBSCRIPTION AND REPORTING FOR TELECOMMUNICATIONS SYSTEMS AND DEVICES

(75) Inventors: Xingguo Zhang, Fremont, CA (US); Nitesh Kumar, San Jose, CA (US); Yimin Zhu, Sunnyvale, CA (US); Sudheera Atluri, San Jose, CA (US); Parthasarathi Dukka, Santa Clara, CA (US)

(73) Assignee: Dialogic, Inc., Milpitas, CA (US)

( * ) Notice: Subject to any disclaimer, the term of this patent is extended or adjusted under 35 U.S.C. 154(b) by 143 days.

(21) Appl. No.: 13/364,673

(22) Filed: Feb. 2, 2012

(65) Prior Publication Data

US 2013/0204959 A1     Aug. 8, 2013

(51) Int. Cl.
| | | |
|---|---|---|
| *G06F 15/16* | (2006.01) | |
| *G06F 15/167* | (2006.01) | |
| *G06Q 40/00* | (2012.01) | |
| *G06Q 40/04* | (2012.01) | |
| *H04L 29/08* | (2006.01) | |

(52) U.S. Cl.
CPC .............. *H04L 67/26* (2013.01); *H04L 67/02* (2013.01); *G06Q 40/04* (2013.01)
USPC ........... 709/206; 709/213; 709/219; 709/223; 705/37

(58) Field of Classification Search
CPC ......... H04L 67/26; H04L 67/02; G04Q 40/04
USPC ...................... 709/202–233; 719/313; 705/37
See application file for complete search history.

(56) References Cited

U.S. PATENT DOCUMENTS

| | | | |
|---|---|---|---|
| 2006/0047666 A1* | 3/2006 | Bedi et al. | 707/10 |
| 2006/0085507 A1* | 4/2006 | Zhao et al. | 709/206 |
| 2007/0088711 A1* | 4/2007 | Craggs | 707/10 |
| 2008/0141274 A1* | 6/2008 | Bhogal et al. | 719/313 |
| 2009/0037533 A1* | 2/2009 | Gilfix et al. | 709/205 |
| 2011/0066715 A1* | 3/2011 | Schieder et al. | 709/223 |
| 2011/0099288 A1* | 4/2011 | Sedlak et al. | 709/233 |
| 2011/0167138 A1* | 7/2011 | Fieau et al. | 709/219 |
| 2011/0320533 A1* | 12/2011 | Belinsky et al. | 709/203 |
| 2012/0096123 A1* | 4/2012 | Klein et al. | 709/219 |
| 2012/0259761 A1* | 10/2012 | Subramanian et al. | 705/37 |
| 2013/0159449 A1* | 6/2013 | Taylor et al. | 709/212 |
| 2013/0198381 A1* | 8/2013 | Caffrey et al. | 709/225 |

\* cited by examiner

*Primary Examiner* — Wing F Chan
*Assistant Examiner* — Raji Krishnan
(74) *Attorney, Agent, or Firm* — Chapin IP Law, LLC

(57) ABSTRACT

Systems and methods of performing real-time data subscription and reporting for telecommunications systems and devices. The systems and methods employ a real-time data aggregation component that can manage subscription requests for real-time data objects stored on the telecommunications systems and devices from one or more users over a network, dynamically start and stop such subscription requests, cache the requested real-time data objects, and supply the real-time data to the respective users. By employing the real-time data aggregation component to handle such subscription requests for data from one or more users, the systems and methods can supply such data, including real-time data, to the respective users, while reducing the overhead on the telecommunications systems and devices and increasing overall system performance.

26 Claims, 5 Drawing Sheets

SYSTEMS AND METHODS OF REAL-TIME DATA SUBSCRIPTION AND REPORTING FOR TELECOMMUNICATIONS SYSTEMS AND DEVICES

CROSS REFERENCE TO RELATED APPLICATIONS

Not applicable

STATEMENT REGARDING FEDERALLY SPONSORED RESEARCH OR DEVELOPMENT

Not applicable

FIELD OF THE INVENTION

The present application relates generally to systems and methods of consuming real-time data from one or more data sources, and more specifically to systems and methods of performing real-time data subscription and reporting for telecommunications systems and devices.

BACKGROUND OF THE INVENTION

Telecommunications systems and devices, such as access systems, network management systems, media switching centers, cross-connects, session border controllers, etc., can be adapted via configuration data to provide specific functionality for a target application. Based on such configuration data, control software within the telecommunications systems and devices can control the respective systems and devices to satisfy the requirements of the target application. For example, such configuration data can be specified for a session border controller to satisfy the requirements of access and interconnect applications within mobile and/or fixed voice-over-Internet protocol (such voice-over-Internet protocol is also referred to herein as "VoIP") networks. By adapting the session border controller using such configuration data, the session border controller can be effectively controlled to provide security for the interconnect and access network infrastructure, thereby assuring that VoIP services are made continuously available while maintaining a high level of system performance.

In typical telecommunications systems and devices, large amounts of complex configuration data, including real-time data, must generally be stored and managed. Further, in certain applications, such telecommunications systems and devices may, at times, be monitored over a network by multiple users that may request access to different but possibly overlapping portions of the real-time data, at different but possibly overlapping time intervals. However, tasks relating to the collection of such real-time data requested by multiple users can create an inordinate amount of overhead on the telecommunications systems and devices that are called upon to supply the requested data, thereby potentially decreasing overall system performance.

It would therefore be desirable to have systems and methods of performing real-time data subscription and reporting for telecommunications systems and devices that better address the issues relating to the supplying of real-time data in response to one or more user requests over a network.

BRIEF SUMMARY OF THE INVENTION

In accordance with the present application, systems and methods of performing real-time data subscription and reporting for telecommunications systems and devices are disclosed. The presently disclosed systems and methods employ a real-time data aggregation component that can manage subscription requests, from one or more users over a network, for real-time data objects stored on the telecommunications systems and devices, dynamically start and/or stop such subscription requests, cache the requested real-time data objects, and supply the real-time data on the data objects to the respective users. By employing the real-time data aggregation component to handle such subscription requests for data from one or more users, the presently disclosed systems and methods can supply such data, including real-time data, to the respective users, while beneficially reducing the overhead on the telecommunications systems and devices and maintaining high system performance.

In accordance with a first aspect, an exemplary system for providing real-time data subscription and reporting for telecommunications systems and devices (such an exemplary system is also referred to herein as a/the "real-time data subscription and reporting system") includes at least the real-time data aggregation component. The real-time data subscription and reporting system can further include at least one additional functional component, such as a view manager component, which can be implemented as a web-based user interface. In accordance with a first exemplary aspect, at least one user client can access the real-time data subscription and reporting system over a network via a web browser, which is communicably coupleable to the view manager component via a network connection. The view manager component is communicably coupled to the real-time data aggregation component, which, in turn, is communicably coupleable to one or more telecommunications systems and/or devices acting as data suppliers. For example, configuration data, including real-time data, can be stored in data repositories associated with the respective data suppliers on objects (such objects are also referred to herein as "data objects").

In accordance with an exemplary mode of operation of the real-time data subscription and reporting system, at least one user client sends, to the view manager component using the web browser, a first request for real-time data, which may be stored in the data repositories of one or more data suppliers on one or more, possibly different, data objects. For example, the real-time data requested by the user client can include data stored on a first data object in the data repository of a first data supplier, and data stored on a second data object in the data repository of a second data supplier. The view manager component forwards the first request for real-time data from the user client to the real-time data aggregation component, which sends a first subscription start message to the first data supplier for the first data object, and sends a second subscription start message to the second data supplier for the second data object. In response to the first and second subscription start messages from the real-time data aggregation component, the first data supplier sends the data on the first data object, and the second data supplier sends the data on the second data object, to the real-time data aggregation component, which caches the data on the first and second data objects. Further, the real-time data aggregation component generates a first list of users that have made requests for the data on the first data object, and generates a second list of users that have made requests for the data on the second data object. Because, in this exemplary mode of operation of the real-time data subscription and reporting system, the user client sent the first request for the data stored on the first and second data objects, the user client is included in both the first list and the second list of users generated by the real-time data aggregation component. The real-time data aggregation component sends the data stored on the first and second data objects to the view manager component, which forwards the data to report the requested real-time data to the user client. At a predetermined time interval, the user client sends a second request for the real-time data stored on the first and second data objects to the view manager component, which forwards the second request for real-time data to the real-time data aggregation component. In accordance with an exemplary aspect, the user client may send such requests for the real-time data stored on the first and second data objects periodically at the predetermined time interval. Because the data on the first and second data objects are now cached on the real-time data aggregation component, the real-time data aggregation component can substantially immediately send the data on the first and second data objects to the view manager component, which can then forward the data to report the requested real-time data to the user client. In further accordance with this exemplary aspect, the user client may stop sending such requests for the real-time data stored on the first and second data objects. After having not received a further request from the user client for the data on the first data object and/or the second data object for a predetermined period of time, the real-time data aggregation component can remove the user client from the first list and/or the second list of users, as appropriate. Further, in the event all user clients have been removed from the first list and/or the second list of users, the real-time data aggregation component can send a first subscription stop message to the first data supplier for the first data object, and/or send a second subscription stop message to the second data supplier for the second data object. In this way, the first and second data suppliers can be prevented from unnecessarily sending updated data on the first and second data objects, respectively, to the real-time data aggregation component, in response to possible changes in certain characteristics of the respective data objects.

In further accordance with the exemplary mode of operation of the real-time data subscription and reporting system, multiple user clients can send, to the view manager component, one or more requests for real-time data stored in the data repositories of the respective data suppliers. For example, the multiple user clients may send requests for different but possibly overlapping portions of real-time data stored on a data object in the data repository of a respective data supplier, periodically at different but possibly overlapping time intervals. The view manager component forwards the requests for real-time data from the respective user clients to the real-time data aggregation component. In accordance with an exemplary aspect, the real-time data aggregation component consolidates the requests for the real-time data from the respective user clients into a single subscription start message, and sends the subscription start message to the respective data supplier for the data object. In response to the subscription start message from the real-time data aggregation component, the data supplier sends the data on the data object to the real-time data aggregation component, which caches the data on the data object. Further, the real-time data aggregation component generates a list of users that have made requests for the data on the data object. Because the respective user clients have made requests for different but possibly overlapping portions of data on the same data object, the list of users generated by the real-time data aggregation component is a consolidated list that includes each of the respective user clients. The real-time data aggregation component sends the portions of the data stored on the data object that were requested by the respective user clients to the view manager component, which forwards the portions of the data to report the requested real-time data to the respective user clients. One or more of the respective user clients may then stop sending such requests for the real-time data stored on the data object. After having not received further requests from the respective user clients for the data on the data object for a predetermined period of time, the real-time data aggregation component can remove one or more of the respective user clients from the consolidated list of users, as appropriate. In further accordance with this exemplary aspect, in the event all user clients have been removed from the consolidated list of users, the real-time data aggregation component can consolidate the stopping of the requests for the real-time data from the respective user clients into a single subscription stop message, and send the subscription stop message to the respective data supplier for the data object. In this way, the data supplier can be prevented from unnecessarily sending updated data on the data object to the real-time data aggregation component, in response to possible changes in certain characteristics of the data object.

By employing the real-time data aggregation component to handle subscription requests for data from one or more users, the real-time data subscription and reporting system can beneficially supply such data, including real-time data, to the respective users, while reducing the overhead on the telecommunications systems and devices that are called upon to supply the requested data, thereby maintaining high system performance.

Other features, functions, and aspects of the invention will be evident from the Drawings and/or the Detailed Description of the Invention that follow.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

Systems and methods of performing real-time data subscription and reporting for telecommunications systems and devices are disclosed. In the presently disclosed systems and methods, a real-time data aggregation component is employed that can manage subscription requests, from one or more users over a network, for real-time data objects stored on the telecommunications systems and devices, dynamically start and/or stop such subscription requests, cache the requested real-time data objects, and supply the real-time data on the data objects to the respective users. By employing the real-time data aggregation component to handle such subscription requests for data from one or more users, the presently disclosed systems and methods can beneficially supply such data, including real-time data, to the respective users, while reducing the overhead on the telecommunications systems and devices and maintaining high system performance.

Figure 1:
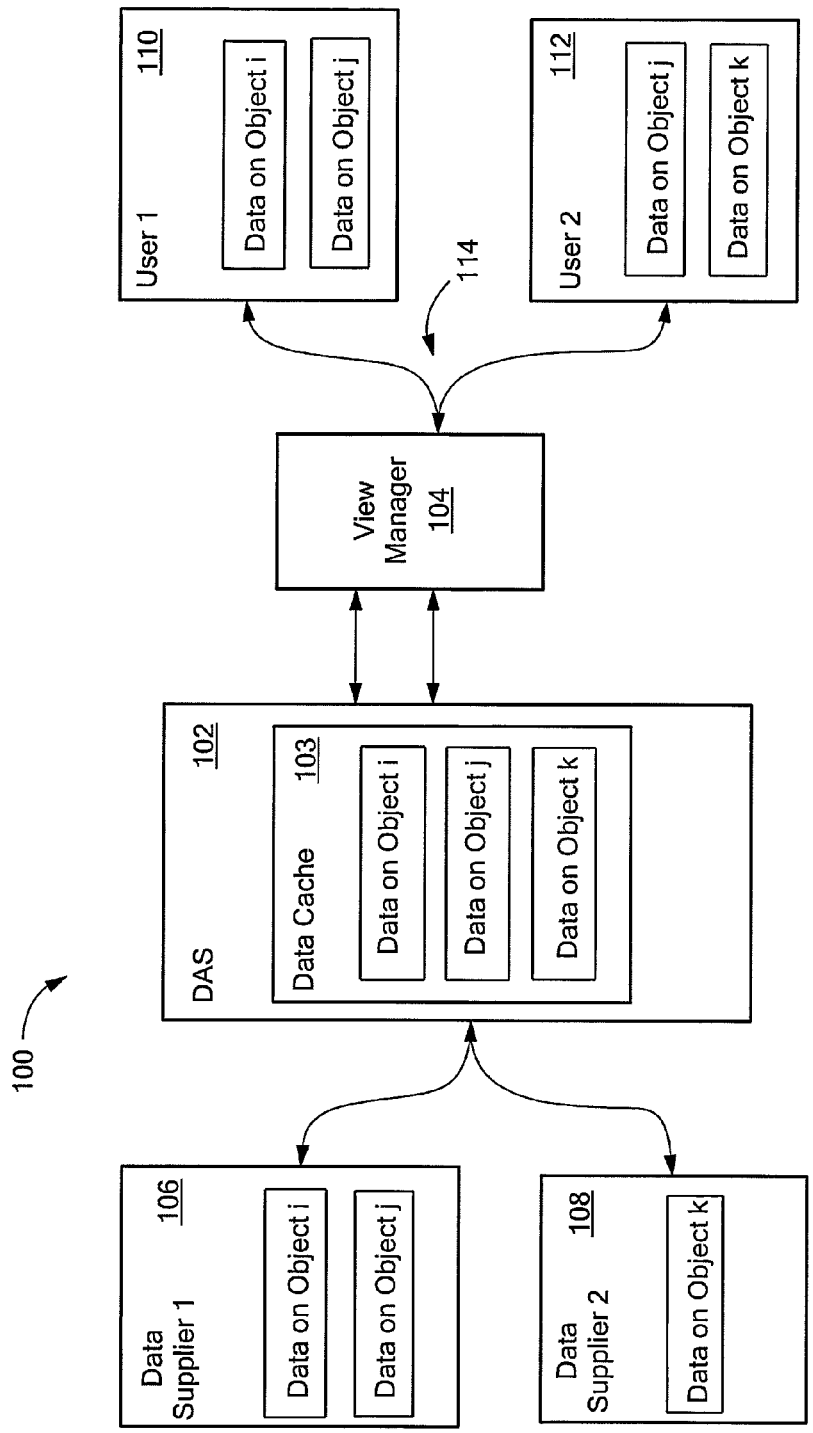
FIG. 1 is a block diagram of an exemplary real-time data subscription and reporting system, in accordance with an exemplary embodiment of the present application.

FIG. 1 depicts an illustrative embodiment of an exemplary real-time data subscription and reporting system 100, in accordance with an exemplary embodiment of the present application. The real-time data subscription and reporting system 100 includes a real-time data aggregation component 102 that has a cache memory 103 (such a cache memory is also referred to herein as a/the "data cache"), and a view manager component 104. In accordance with the illustrative embodiment of FIG. 1, one or more user clients, such as user clients 110, 112, can access the real-time data subscription and reporting system 100 over a network. For example, each of the user clients 110, 112 can be implemented as any suitable client, including, but not limited to, a web client. Further, the view manager component 104 can be implemented as any suitable server interface, including, but not limited to, a web server interface. Each of the user clients 110, 112 can therefore access the real-time data subscription and reporting system 100 over the network via a web browser, which is communicably coupleable to the view manager component 104 via a network connection 114.

As shown in FIG. 1, the view manager component 104 is communicably coupled to the real-time data aggregation component 102, which, in turn, is communicably coupleable to one or more telecommunications systems and/or devices acting as data suppliers 106, 108. For example, the data suppliers 106, 108 may be implemented as access systems, network management systems, media switching centers, cross-connects, session border controllers, and/or any other suitable telecommunications systems and/or devices. In accordance with the illustrative embodiment of FIG. 1, data, such as configuration data, including but not limited to real-time data, can be stored in data repositories associated with the respective data suppliers 106, 108 on objects (such objects are also referred to herein as "data objects"). For example, such real-time data can be stored in the data repository associated with the data supplier 106 on a data object i and/or a data object j, and such real-time data can be stored in the data repository associated with the data supplier 108 on data object k.

Figure 2:
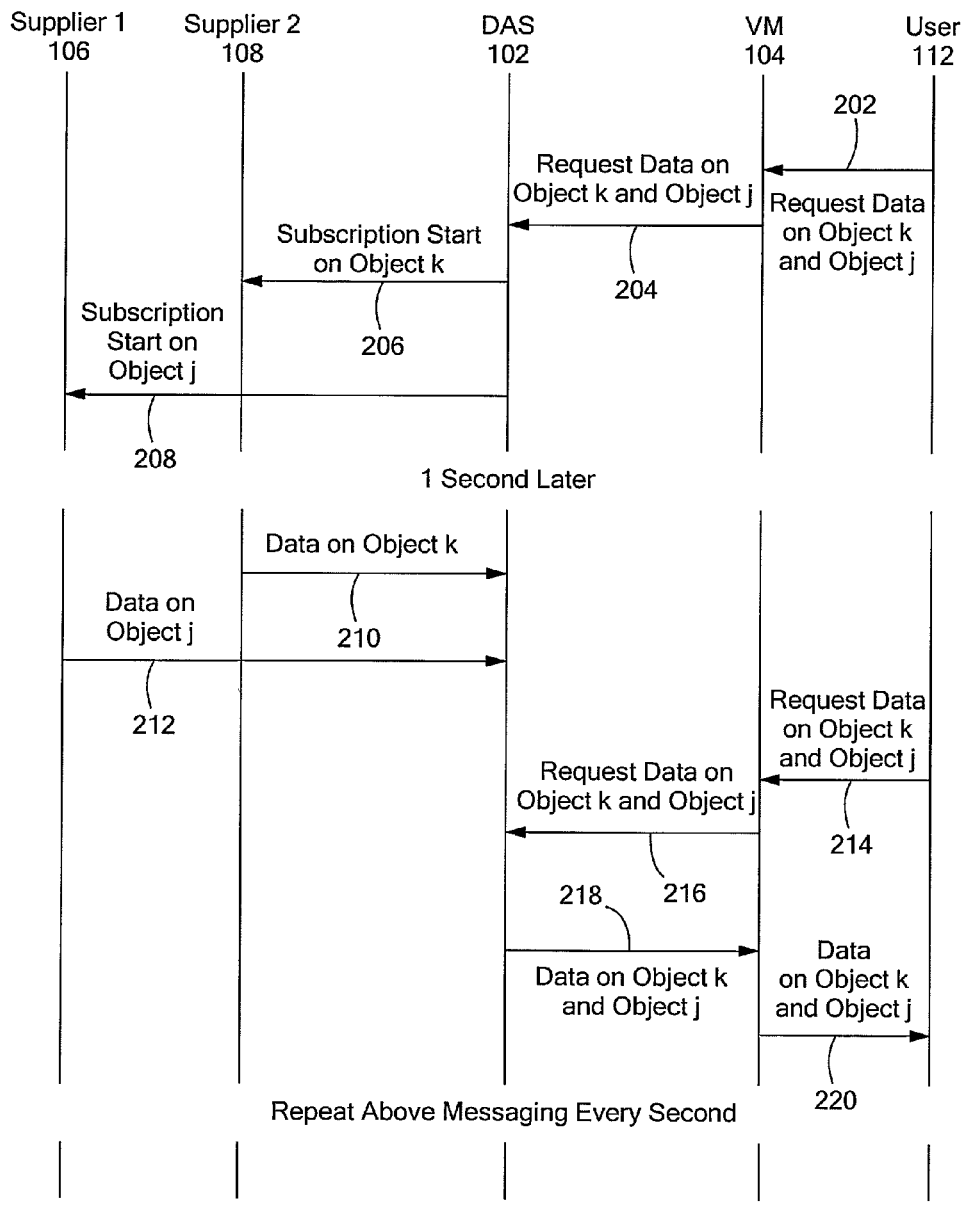
FIG. 2 is a diagram illustrating an exemplary messaging flow between exemplary data suppliers, an exemplary real-time data aggregation component, an exemplary view manager component, and an exemplary user client, within the exemplary real-time data subscription and reporting system of FIG. 1.

FIG. 2 illustrates an exemplary messaging flow between the data suppliers 106 and 108, the real-time data aggregation component 102, the view manager component 104, and the user client 112, within the real-time data subscription and reporting system 100 (see also FIG. 1). In accordance with an exemplary mode of operation of the real-time data subscription and reporting system 100, the user client 112 sends, to the view manager component 104 (such view manager component is also referred to in FIG. 2 as "VM"), a request for data, such as real-time data, on the data object j and/or the data object k (as indicated in FIG. 2 by reference numeral 202), which are stored in the data repositories of the data suppliers 106, 108, respectively. The view manager component (VM) 104 forwards the request for real-time data on the data object j and/or the data object k (as indicated in FIG. 2 by reference numeral 204) to the real-time data aggregation component 102 (such real-time data aggregation component is also referred to in FIG. 2 as "DAS"), which sends a first subscription start message to the data supplier 108 for the data object k (as indicated in FIG. 2 by reference numeral 206), and/or a second subscription start message to the data supplier 106 for the data object j (as indicated in FIG. 2 by reference numeral 208). In response to the first and second subscription start messages from the real-time data aggregation component (DAS) 102, the data supplier 108 sends, at a predetermined time interval (e.g., one second, or any other suitable time interval), the data on the data object k (as indicated in FIG. 2 by reference numeral 210), and/or the data supplier 106 sends, at approximately the predetermined time interval, the data on the data object j (as indicated in FIG. 2 by reference numeral 212), to the real-time data aggregation component (DAS) 102, which caches the data on the respective data objects j and/or k in the data cache 103 (see FIG. 1). In addition, at approximately the predetermined time interval, the user client 112 sends a further request for the real-time data stored on the data object j and/or the data object k (as indicated in FIG. 2 by reference numeral 214) to the view manager component (VM) 104, which forwards the further request for real-time data on the data object j and/or the data object k (as indicated in FIG. 2 by reference numeral 216) to the real-time data aggregation component (DAS) 102. In accordance with this exemplary mode of operation of the real-time data subscription and reporting system 100, the user client 112 may send such requests for real-time data on the data object j and/or the data object k periodically at approximately the predetermined time interval (e.g., about once every second). Because the data on the data object j and/or the data object k are now cached in the data cache 103 (see FIG. 1) of the real-time data aggregation component (DAS) 102, the real-time data aggregation component (DAS) 102 can substantially immediately send the data on the data object j and/or the data object k (as indicated in FIG. 2 by reference numeral 218) to the view manager component (VM) 104, which can then forward the data on the data object j and/or the data object k (as indicated in FIG. 2 by reference numeral 220) to report the requested real-time data to the user client 112.

Figure 3A:
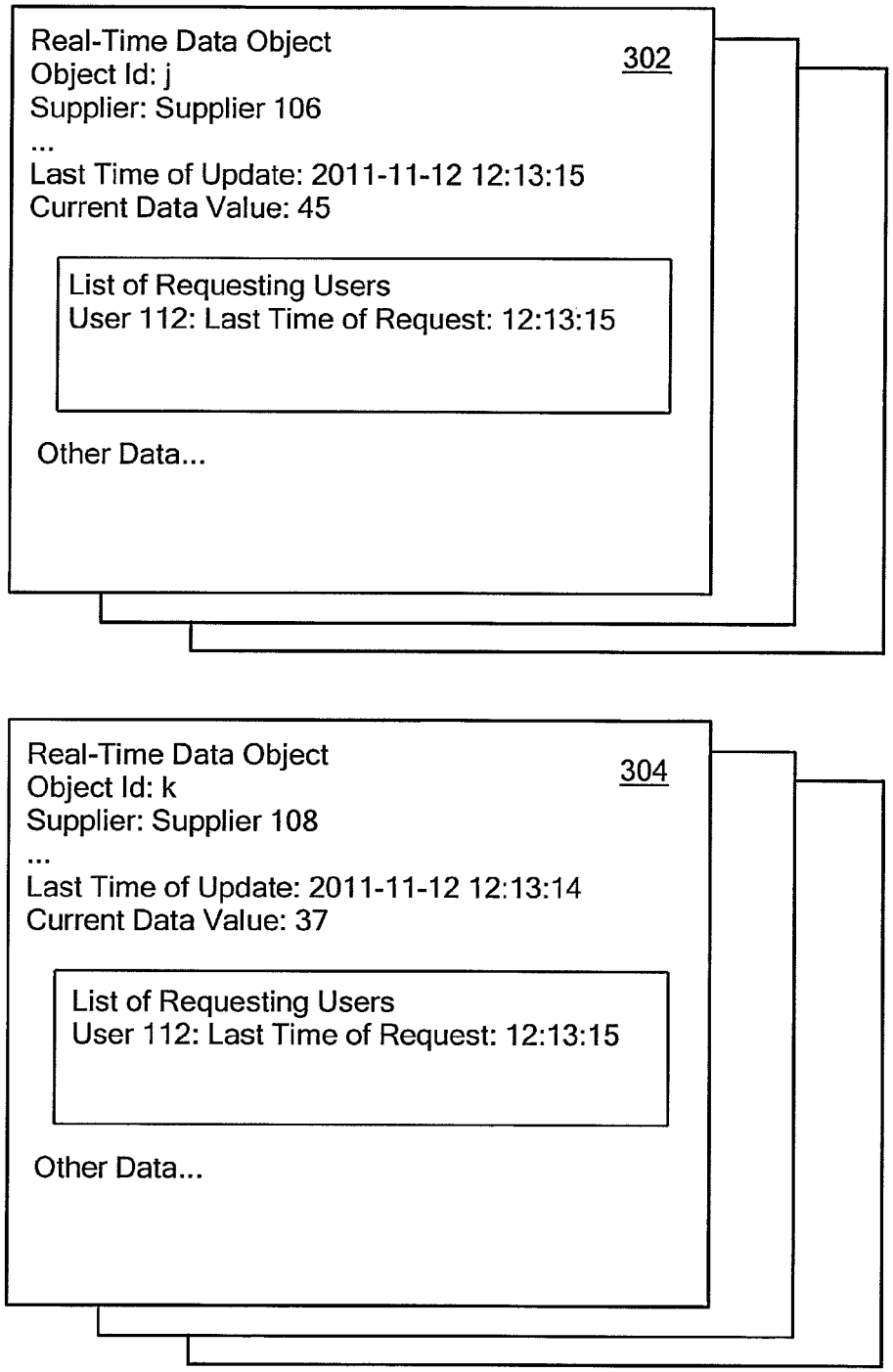
FIGS. 3a-3b illustrate exemplary representations of a plurality of exemplary real-time data objects that can be maintained within the exemplary real-time data aggregation component of FIG. 2.

FIG. 3a illustrates an exemplary representation 302 of the data object j, and an exemplary representation 304 of the data object k, each of which data objects can be stored, cached, and/or otherwise maintained within the real-time data aggregation component (DAS) 102 (see also FIGS. 1 and 2). As shown in FIG. 3a, the representation 302 of the data object j includes an indication of the object ID, namely, j; an indication of the supplier of the data object j, namely, the data supplier 106; an indication of the last time of update of the data object j, e.g., 2011-11-12 12:13:15; an indication of the current data value of the data object j, e.g., 45; a list of the user clients requesting the data object j and the last times of the respective requests, e.g., the user client 112, last time of request 12:13:15; and/or, any other suitable data. Similarly, the representation 304 of the data object k includes an indication of the object ID, namely, k; an indication of the supplier of the data object k, namely, the data supplier 108; an indication of the last time of update of the data object k, e.g., 2011-11-12 12:13:14; an indication of the current data value of the data object k, e.g., 37; a list of the user clients requesting the data object k and the last times of the respective requests, e.g., the user client 112, last time of request 12:13:15; and/or, any other suitable data.

In accordance with the exemplary mode of operation of the real-time data subscription and reporting system 100, and as described above with reference to FIG. 2, the real-time data aggregation component (DAS) 102 generates the list of user clients that have made requests for the data on the data object j (as indicated with reference to the representation 302 of the data object j; see FIG. 3a), and/or generates the list of user clients that have made requests for the data on the data object k (as indicated with reference to the representation 304 of the data object k; see FIG. 3a). Because, in this exemplary mode of operation of the real-time data subscription and reporting system 100, the user client 112 sent the request for the data stored on the data object j and/or the data object k, the user client 112 can be included, as appropriate, in one or both of the lists of user clients generated by the real-time data aggregation component (DAS), as indicated with reference to the representations 302, 304 (see FIG. 3a) of the data objects j and k, respectively.

It is noted that the user client 112 may, as desired and/or as required, stop sending such requests for the real-time data stored on the data object j and/or the data object k. After having not received a further request from the user client 112 for the data on the data object j and/or for the data on the data object k, for a predetermined period of time, the real-time data aggregation component (DAS) 102 can remove the user client 112 from the respective lists of user clients that have made requests for the data on the data objects j and k, as appropriate. Further, in the event all user clients have been removed from one or both of the lists of user clients that have made requests for the data on the data object j and/or the data object k, the real-time data aggregation component (DAS) 102 can send a subscription stop message to the data supplier 106 for the data object j, and/or send a subscription stop message to the data supplier 108 for the data object k. In this way, the data suppliers 106, 108 can be prevented from unnecessarily sending updated data on the data object j and/or the data object k, respectively, to the real-time data aggregation component (DAS) 102, in response to possible changes in certain characteristics of the respective data objects j and k.

In accordance with a further exemplary mode of operation of the real-time data subscription and reporting system 100 (see FIG. 1), one or both of the user clients 110, 112 can send, to the view manager component 104, one or more requests for real-time data stored in the data repositories of the respective data suppliers 106, 108. Such requests may include one or more requests for different but possibly overlapping portions of real-time data stored on a data object in the data repository of at least one of the data suppliers 106, 108. Such requests may also be sent, to the view manager component 104, periodically at different but possibly overlapping time intervals. For example, each of the user clients 110, 112 can send, to the view manager component 104, a request for real-time data on the data object j that is stored in the data repository of the data supplier 106 (see FIG. 1). In addition, the user client 110 can send, to the view manager component 104, a request for real-time data on the data object i that is also stored in the data repository of the data supplier 106 (see FIG. 1), and the user client 112 can send, to the view manager component 104, a request for real-time data on the data object k that is stored in the data repository of the data supplier 108 (see FIG. 1). The view manager component 104 forwards the requests for real-time data from the respective user clients 110, 112 to the real-time data aggregation component 102. In accordance with this further exemplary mode of operation of the real-time data subscription and reporting system 100, the real-time data aggregation component 102 can consolidate the respective requests for the real-time data on the data object j from the user clients 110, 112 into a single subscription start message, and send the subscription start message to the data supplier 106 for the data object j. The real-time data aggregation component 102 also sends a subscription start message to the data supplier 106 for the data object i, and a subscription start message to the data supplier 108 for the data object k. In response to the subscription start messages for the data object i and the data object j, the data supplier 106 sends the data on the respective data objects i and j to the real-time data aggregation component 102. Further, in response to the subscription start message for the data object k, the data supplier 108 sends the data on the data object k to the real-time data aggregation component 102.

Having received the data on the respective data objects i, j, and k, the real-time data aggregation component 102 caches the received data in the data cache 103 (see FIG. 1). In addition, the real-time data aggregation component 102 generates (1) a list of user clients, including the user client 110, that have made requests for the data on the data object i, (2) a list of user clients, including the user clients 110, 112, that have made requests for the data on the data object j, and (3) a list of user clients, including the user client 112, that have made requests for the data on the data object k. Because the user clients 110, 112 have made requests for different but possibly overlapping portions of data on the data object j, the list of user clients that have made requests for the data on the data object j is a consolidated list that includes each of the user clients 110, 112. The real-time data aggregation component 102 sends the portions of the data stored on the data object j that were requested by the respective user clients 110, 112 to the view manager component 104, which forwards the data to report the requested real-time data on the data object j to the respective user clients 110, 112. The real-time data aggregation component 102 also sends the data stored on the data object i that was requested by the user client 110, and the data stored on the data object k that was requested by the user client 112, to the view manager component 104, which forwards the data to report the requested real-time data on the data object i and the data object k to the user clients 110, 112, respectively. One or both of the user clients 110, 112 may then stop sending such requests for the real-time data stored on the respective data objects i, j, and k. After having not received further requests from the user clients 110, 112 for the data on the respective data objects i, j, and k for a predetermined period of time, the real-time data aggregation component 102 can remove the user clients 110, 112 from the respective lists of user clients that have made requests for the data on the data object i, the data object j, and/or the data object k, as appropriate. In the event all user clients have been removed from one or both of the lists of user clients that have made requests for the data on the data object i and/or the data object k, the real-time data aggregation component 102 can send a subscription stop message to the data supplier 106 for the data object i, and/or send a subscription stop message to the data supplier 108 for the data object k. Moreover, in the event all user clients have been removed from the consolidated list of user clients that have made requests for the data on the data object j, the real-time data aggregation component 102 can consolidate the stopping of the requests for real-time data on the data object j from the respective user clients 110, 112 into a single subscription stop message, and send the subscription stop message to the data supplier 106 for the data object j. In this way, the data suppliers 106, 108 can be prevented from unnecessarily sending updated data on the data object i, the data object j, and/or the data object k to the real-time data aggregation component 102, in response to possible changes in certain characteristics of the respective data objects i, j, and/or k.

Figure 4:
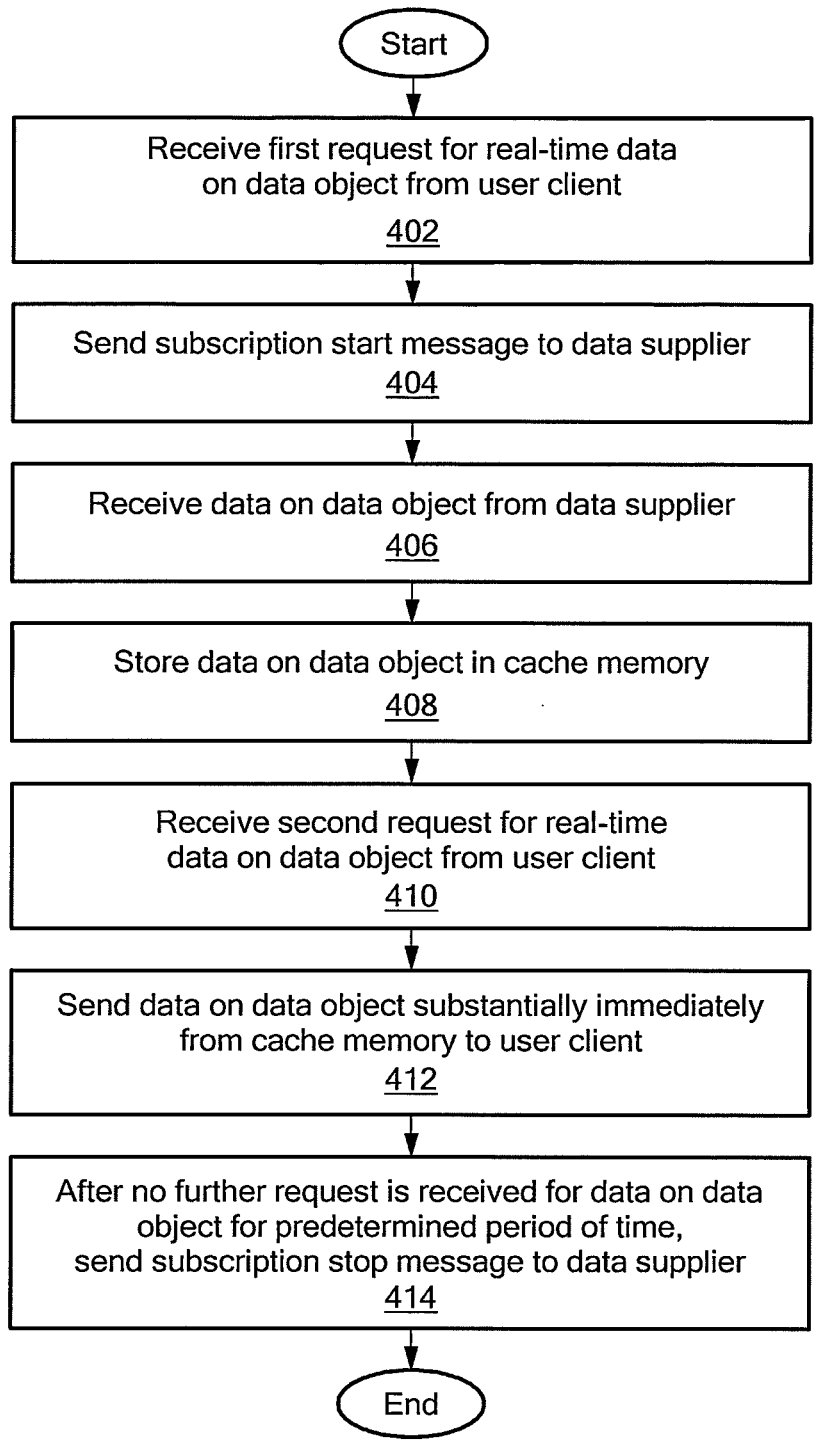
FIG. 4 is a flow diagram of an exemplary method of operating the exemplary real-time data subscription and reporting system of FIG. 1.

An exemplary method of operating the real-time data subscription and reporting system 100 is described below with reference to FIG. 4, as well as FIG. 1. As depicted in step 402 (see FIG. 4), at least one first request for real-time data on at least one data object is received, at the real-time data aggregation component 102 (see FIG. 1), from at least one of the user clients 110, 112 (see FIG. 1). As depicted in step 404 (see FIG. 4), at least one subscription start message is sent, by the real-time data aggregation component 102 (see FIG. 1), to at least one of the data suppliers 106, 108 (see FIG. 1) for the data object. As depicted in step 406 (see FIG. 4), the data on the data object is received, at the real-time data aggregation component 102 (see FIG. 1), from the respective data supplier 106/108 (see FIG. 1) for the data object. As depicted in step 408 (see FIG. 4), the data on the data object is at least temporarily stored in cache memory by the real-time data aggregation component 102 (see FIG. 1). As depicted in step 410 (see FIG. 4), at least one second request for real-time data on the data object is received, at a predetermined time interval at the real-time data aggregation component 102 (see FIG. 1), from the respective user client 110/112 (see FIG. 1). As depicted in step 412 (see FIG. 4), the data on the data object is sent, substantially immediately by the real-time data aggregation component 102 (see FIG. 1), from its cache memory to the respective user client 110/112 (see FIG. 1). As depicted in step 414 (see FIG. 4), after no further request is received at the real-time data aggregation component 102 (see FIG. 1) for the data on the data object for a predetermined period of time, at least one subscription stop message is sent, by the real-time data aggregation component 102 (see FIG. 1), to the respective data supplier 106/108 (see FIG. 1) for the data object.

Having described the above illustrative embodiments of the presently disclosed systems and methods of performing real-time data subscription and reporting for telecommunications systems and devices, further embodiments and/or variations may be made/practiced. For example, it was described herein that data, including but not limited to real-time data, can be stored in the data repositories associated with the respective data suppliers 106, 108 (see FIG. 1) on data objects. Those of ordinary skill in the art will appreciate that each such data object can have an associated type (such an associated type of data object is also referred to herein as an/the "object type"), and each object type can have at least one instance of the data object. It was also described herein that the respective user clients 110, 112 (see FIG. 1) can send one or more requests for such data on one or more of the data objects stored in the data repositories of the respective data suppliers 106, 108 (see FIG. 1). In accordance with one or more further embodiments of the real-time data subscription and reporting system 100 (see FIG. 1), the user clients 110, 112 (see FIG. 1) can send one or more requests for data on one or more data objects, and/or one or more requests for data on one or more instances of the respective data objects. For example, one of the user clients 110, 112 (see FIG. 1) may send a request for data on a first instance of the data object, and another one of the user clients 110, 112 (see FIG. 1) may send a request for data on a second instance of the data object. In accordance with such further embodiments of the real-time data subscription and reporting system 100 (see FIG. 1), the real-time data aggregation component 102 (see FIG. 1) can send one or more subscription start messages to one of the data suppliers 106, 108 (see FIG. 1) for the respective instances of the data object, and send one or more subscription stop messages to the data supplier 106/108 (see FIG. 1) for the respective instances of the data object. The real-time data aggregation component 102 (see FIG. 1) can also send the data on the respective instances of the data object for reporting the requested real-time data to the user clients 110, 112, as appropriate.

Figure 3B:
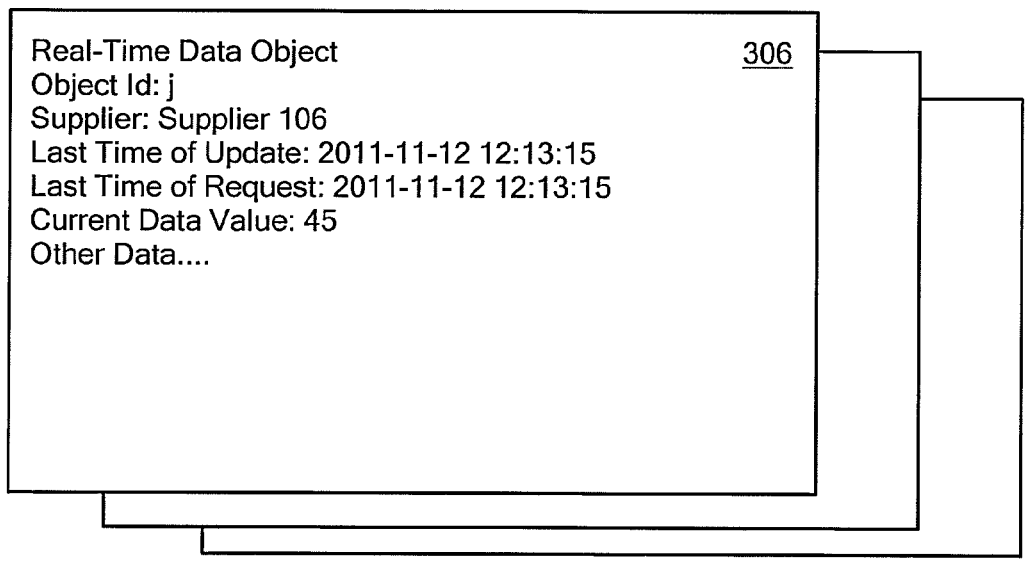

It was further described herein that each data object stored, cached, and/or otherwise maintained within the real-time data aggregation component 102 (see FIG. 1) can include a list of the user clients that have requested the data object, and the last times of the respective requests for the data object. For example, as shown in FIG. 3a, the exemplary representation 302 of the data object j includes a list of the user clients that have requested the data object j, and the last times of the respective requests for the data object j, e.g., "user 112: last time of request: 12:13:15" (see FIG. 3a). In accordance with one or more further embodiments of the real-time data subscription and reporting system 100 (see FIG. 1), the real-time data aggregation component 102 can be configured to track (1) the time of the last request (such a time of the last request is also referred to herein as a/the "timestamp associated with the last request") from one or more user clients for each data object cached in the data cache 103 (see FIGS. 1), and (2) the time of the last update of the data object. Such a timestamp associated with the last request for a data object (e.g., "Last time of request: 2011-11-12 12:13:15;" see FIG. 3b), and such a time of the last update of the data object (e.g., "Last time of update: 2011-11-12 12:13:15;" see FIG. 3b), are illustrated in an exemplary alternative representation 306 of the data object j, as depicted in FIG. 3b. Based at least on a comparison of the timestamp associated with the last request for the data object, and the time of the last update of the data object, the real-time data aggregation component 102 can determine whether or not to send a subscription stop message to the data supplier of the data object, without having to maintain a list of the user clients that have requested the data object.

An exemplary use of the alternative representation 306 of the data object j within the real-time data subscription and reporting system 100 (see FIG. 1) will be further understood with reference to the following illustrative, non-limiting example, and FIGS. 1 and 3b. It is noted that such a representation of a data object, like the alternative representation 306 of the data object j, may be employed for any other data object stored, cached, and/or otherwise maintained within the real-time data aggregation component 102 (see FIG. 1). As shown in FIG. 3b, the alternative representation 306 of the data object j includes an indication of the object ID, namely, j; an indication of the supplier of the data object j, namely, the data supplier 106; an indication of the last time of update of the data object j, e.g., Last time of update: 2011-11-12 12:13:15; an indication of the timestamp associated with the last request for the data object j, e.g., Last time of request: 2011-11-12 12:13:15; an indication of the current data value of the data object j, e.g., Current Data Value: 45; and/or, any other suitable data. For example, in the event the real-time data aggregation component 102 receives a request for the data object j from the user client 110 (see FIG. 1), the real-time data aggregation component 102 can record the current time as the timestamp associated with the last request for the data object j. Further, in the event the real-time data aggregation component 102 receives a request for the data object j from the user client 112 (see FIG. 1), the real-time data aggregation component 102 can remove the previous time that was recorded as the timestamp associated with the last request for the data object j, and replace the previous time recorded as the timestamp associated with the last request for the data object j with the new current time. Moreover, in the event the real-time data aggregation component 102 receives an update of the data object j from the data supplier 106 (see FIG. 1), the real-time data aggregation component 102 can record the current time as the last time of update of the data object j. In addition, the real-time data aggregation component 102 can calculate, derive, and/or otherwise obtain the difference between the last time of update of the data object j, and the timestamp associated with the last request for the data object j, and determine whether or not such a difference exceeds a predetermined threshold value, such as five seconds or any other suitable threshold value. If it is determined that the difference exceeds the predetermined threshold value, then the real-time data aggregation component 102 can send a subscription stop message to the data supplier 106 (see FIG. 1) for the data object j, thereby preventing the data supplier 106 (see FIG. 1) from unnecessarily sending updated data on the data object j to the real-time data aggregation component 102, in response to possible changes in certain characteristics of the data object j.

In accordance with one or more additional embodiments of the real-time data subscription and reporting system 100 (see FIG. 1), the real-time data aggregation component 102 (see FIG. 1) can send subscription start messages to the data suppliers 106, 108 (see FIG. 1) that include timeout values. For example, the real-time data aggregation component 102 (see FIG. 1) can send at least one subscription start message to at least one of the data suppliers 106, 108 (see FIG. 1) that includes a predetermined timeout value, such as 30 seconds or any other suitable timeout value. In response to the subscription start message with the timeout value of 30 seconds, the respective data supplier 106/108 (see FIG. 1) would have no more than 30 seconds in which to send data on a data object to the real-time data aggregation component 102 (see FIG. 1) to satisfy a request for real-time data from one of the user clients 110, 112 (see FIG. 1). In this way, the burden on the data suppliers 106, 108 (see FIG. 1) can be limited, based at least on expiration of the timeout value, in the event of a failure on one or more of the other components within the real-time data subscription and reporting system 100 (see FIG. 1).

Although the presently disclosed systems and methods of performing real-time data subscription and reporting were described herein with reference to one or more telecommunications systems and/or devices acting as data suppliers, it is noted that such data suppliers can include, but are not limited to, such telecommunications systems and/or devices. The disclosed systems and methods of performing real-time data subscription and reporting may be employed in any suitable environment, in which one or more user clients can request real-time data from one or more data sources or suppliers. Such data sources or suppliers can include one or more telecommunications systems and/or devices, one or more data communications systems and/or devices, and/or any other suitable data sources or suppliers.

It is further noted that the operations depicted and/or described herein are purely exemplary, and imply no particular order. Further, the operations can be used in any sequence, when appropriate, and/or can be partially used. With the above illustrative embodiments in mind, it should be understood that such illustrative embodiments can employ various computer-implemented operations involving data transferred or stored in computer systems. Such operations are those requiring physical manipulation of physical quantities. Typically, though not necessarily, such quantities take the form of electrical, magnetic, and/or optical signals capable of being stored, transferred, combined, compared, and/or otherwise manipulated.

Further, any of the operations depicted and/or described herein that form part of the illustrative embodiments are useful machine operations. The illustrative embodiments also relate to a device or an apparatus for performing such operations. The apparatus can be specially constructed for the required purpose, or can be a general-purpose computer selectively activated or configured by a computer program stored in the computer. In particular, various general-purpose machines employing one or more processors coupled to one or more computer readable media can be used with computer programs written in accordance with the teachings disclosed herein, or it may be more convenient to construct a more specialized apparatus to perform the required operations.

The presently disclosed systems and methods can also be embodied as computer readable code on a computer readable medium. The computer readable medium is any data storage device that can store data, which can thereafter be read by a computer system. Examples of such computer readable media include hard drives, read-only memory (ROM), random-access memory (RAM), CD-ROMs, CD-Rs, CD-RWs, magnetic tapes, and/or any other suitable optical or non-optical data storage devices. The computer readable media can also be distributed over a network-coupled computer system, so that the computer readable code can be stored and/or executed in a distributed fashion.

The foregoing description has been directed to particular illustrative embodiments of this disclosure. It will be apparent, however, that other variations and modifications may be made to the described embodiments, with the attainment of some or all of their associated advantages. Moreover, the procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

It will be appreciated by those skilled in the art that modifications to and variations of the above-described systems and methods may be made without departing from the inventive concepts disclosed herein. Accordingly, the disclosure should not be viewed as limited except as by the scope and spirit of the appended claims.

What is claimed is:

1. A real-time data subscription and reporting system for telecommunications systems and devices, the real-time data subscription and reporting system being communicably coupleable, over at least one network, to at least one first user client and at least one first telecommunications system or device, the real-time data subscription and reporting system comprising:

a real-time data aggregation component including a cache memory, the real-time data aggregation component being operative:

in response to receipt of at least one first request for the real-time data from the first user client, to send at least one subscription start message for the real-time data to the first telecommunications system or device;

to receive, at a first predetermined time interval, the real-time data from the first telecommunications system or device;

to store the real-time data in the cache memory;

in response to receipt, at a second predetermined time interval, of at least one second request for the real-time data from the first user client, to send, substantially immediately in response to the second request for the real-time data, the real-time data from the cache memory to the first user client;

to determine a time of a last request for the real-time data;

to determine a time of a last update to the real-time data;

to determine whether to send at least one subscription stop message for the real-time data to the first telecommunications system or device based at least on a comparison of the time of the last request and the time of the last update; and in the event it is determined to send at least one subscription stop message for the real-time data, to send the at least one subscription stop message for the real-time data to the first telecommunications system or device.

2. The real-time data subscription and reporting system of claim 1 wherein the real-time data aggregation component is further operative to receive at least one update to the real-time data from the first telecommunications system or device, in response to at least one change in the real-time data.

3. The real-time data subscription and reporting system of claim 1 wherein the real-time data includes first data on a first data object and second data on a second data object, and wherein the real-time data aggregation component is further operative:
to send at least one first subscription start message for the first data object to the first telecommunications system or device; and
to send at least one second subscription start message for the second data object to a second telecommunications system or device.

4. The real-time data subscription and reporting system of claim 3 wherein the real-time data aggregation component is further operative:
to receive the first data on the first data object from the first telecommunications system or device; and
to receive the second data on the second data object from the second telecommunications system or device.

5. The real-time data subscription and reporting system of claim 4 wherein the real-time data aggregation component is further operative to store the first data on the first data object, and the second data on the second data object, in the cache memory.

6. The real-time data subscription and reporting system of claim 1 wherein the real-time data aggregation component is further operative to generate at least one list of user clients that have made at least one request for the real-time data, the list of user clients including the first user client.

7. The real-time data subscription and reporting system of claim 6 wherein the real-time data aggregation component is further operative, after having received no further request for the real-time data for a predetermined period of time, to remove the first user client from the list of user clients.

8. The real-time data subscription and reporting system of claim 7 wherein the real-time data aggregation component is further operative, in the event all user clients have been removed from the list of user clients, to send the subscription stop message to the first telecommunications system or device.

9. The real-time data subscription and reporting system of claim 1 wherein the real-time data aggregation component is further operative:
to receive at least one request for a first portion of data on a first data object from the first user client; and
to receive at least one request for a second portion of data on the first data object from a second user client.

10. The real-time data subscription and reporting system of claim 9 wherein the real-time data aggregation component is further operative:
to consolidate the requests for the first portion of data and the second portion of data on the first data object into a consolidated subscription start message for the first and second portions of data on the first data object; and
to send the consolidated subscription start message to the first telecommunications system or device.

11. The real-time data subscription and reporting system of claim 10 wherein the real-time data aggregation component is further operative to consolidate at least one list of user clients that have made at least one request for the first and second portions of data on the first data object into a consolidated list of user clients, the consolidated list of user clients including the first user client and the second user client.

12. The real-time data subscription and reporting system of claim 11 wherein the real-time data aggregation component is further operative, after having received no further requests for the first and second portions of data on the first data object for a predetermined period of time, to remove one or both of the first user client and the second user client from the consolidated list of user clients.

13. The real-time data subscription and reporting system of claim 12 wherein the real-time data aggregation component is further operative:
in the event all user clients have been removed from the consolidated list of user clients, to consolidate the no further requests for the first and second portions of data on the first data object into a consolidated subscription stop message; and
to send the consolidated subscription stop message for the first and second portions of data on the first data object to the first telecommunications system or device.

14. The real-time data subscription and reporting system of claim 1 wherein the real-time data aggregation component is further operative:
to send the subscription start message for the real-time data to the first telecommunications system or device, the subscription start message including a timeout value for the first telecommunications system or device; and
prior to expiration of the timeout value, to receive the real-time data from the first telecommunications system or device.

15. A real-time data subscription and reporting system for telecommunications systems and devices, the real-time data subscription and reporting system being communicably coupleable, over at least one network, to at least one first user client and at least one first telecommunications system or device, the real-time data subscription and reporting system comprising:
a real-time data aggregation component including a cache memory, the real-time data aggregation component being operative:
in response to receipt of at least one first request for the real-time data from the first user client, to send at least one subscription start message for the real-time data to the first telecommunications system or device;
to receive, at a first predetermined time interval, the real-time data from the first telecommunications system or device;
to store the real-time data in the cache memory;
in response to receipt, at a second predetermined time interval, of at least one second request for the real-time data from the first user client, to send, substantially immediately in response to the second request for the real-time data, the real-time data from the cache memory to the first user client;
to determine a time of a last request for the real-time data;
to determine a time of a last update to the real-time data;
to obtain a difference between the time of the last update to the real-time data, and the time of the last request for the real-time data; and
in the event the difference between the time of the last update to the real-time data and the time of the last request for the real-time data exceeds a predetermined threshold value, to send the subscription stop message to the first telecommunications system or device.

16. A method of providing real-time data subscription and reporting for telecommunications systems and devices, comprising the steps of:
  in response to receipt of at least one first request for real-time data from a first user client, sending, by a real-time data aggregation component including a cache memory, at least one subscription start message for the real-time data to a first telecommunications system or device;
  receiving, at a first predetermined time interval at the real-time data aggregation component, the real-time data from the first telecommunications system or device;
  storing, by the real-time data aggregation component, the real-time data in the cache memory;
  in response to receipt, at a second predetermined time interval, of at least one second request for the real-time data from the first user client, sending, by the real-time data aggregation component substantially immediately in response to the second request for the real-time data, the real-time data from the cache memory to the first user client;
  determining, by the real-time data aggregation component, a time of a last request for the real-time data;
  determining, by the real-time data aggregation component, a time of a last update to the real-time data;
  determining, by the real-time data aggregation component, whether to send at least one subscription stop message for the real-time data to the first telecommunications system or device based at least on a comparison of the time of the last request and the time of the last update; and
  in the event it is determined to send at least one subscription stop message for the real-time data, sending, by the real-time data aggregation component, the at least one subscription stop message for the real-time data to the first telecommunications system or device.

17. The method of claim 16 further comprising:
  generating, by the real-time data aggregation component, at least one list of user clients that have made at least one request for the real-time data, the list of user clients including the first user client.

18. The method of claim 17 further comprising:
  after having received no further request for the real-time data for a predetermined period of time, removing, by the real-time data aggregation component, the first user client from the list of user clients.

19. The method of claim 18 further comprising:
  in the event all user clients have been removed from the list of user clients, sending, by the real-time data aggregation component, the subscription stop message to the first telecommunications system or device.

20. The method of claim 16 further comprising:
  receiving, at the real-time data aggregation component, at least one request for a first portion of data on a first data object from the first user client; and
  receiving, at the real-time data aggregation component, at least one request for a second portion of data on the first data object from a second user client.

21. The method of claim 20 further comprising:
  consolidating, by the real-time data aggregation component, the requests for the first portion of data and the second portion of data on the first data object into a consolidated subscription start message for the first and second portions of data on the first data object; and
  sending, by the real-time data aggregation component, the consolidated subscription start message to the first telecommunications system or device.

22. The method of claim 21 further comprising:
  consolidating, by the real-time data aggregation component, at least one list of user clients that have made at least one request for the first and second portions of data on the first data object into a consolidated list of user clients, the consolidated list of user clients including the first user client and the second user client.

23. The method of claim 22 further comprising:
  after having received no further requests for the first and second portions of data on the first data object for a predetermined period of time, removing, by the real-time data aggregation component, one or both of the first user client and the second user client from the consolidated list of user clients.

24. The method of claim 23 further comprising:
  in the event all user clients have been removed from the consolidated list of user clients, consolidating, by the real-time data aggregation component, the no further requests for the first and second portions of data on the first data object into a consolidated subscription stop message; and
  sending, by the real-time data aggregation component, the consolidated subscription stop message for the first and second portions of data on the first data object to the first telecommunications system or device.

25. The method of claim 16 further comprising:
  sending, by the real-time data aggregation component, the subscription start message for the real-time data to the first telecommunications system or device, the subscription start message including a timeout value for the first telecommunications system or device; and
  prior to expiration of the timeout value, receiving, at the real-time data aggregation component, the real-time data from the first telecommunications system or device.

26. A method of providing real-time data subscription and reporting for telecommunications systems and devices, comprising the steps of:
  in response to receipt of at least one first request for real-time data from a first user client, sending, by a real-time data aggregation component including a cache memory, at least one subscription start message for the real-time data to a first telecommunications system or device;
  receiving, at a first predetermined time interval at the real-time data aggregation component, the real-time data from the first telecommunications system or device;
  storing, by the real-time data aggregation component, the real-time data in the cache memory;
  in response to receipt, at a second predetermined time interval, of at least one second request for the real-time data from the first user client, sending, by the real-time data aggregation component substantially immediately in response to the second request for the real-time data, the real-time data from the cache memory to the first user client;
  determining, by the real-time data aggregation component, a time of a last request for the real-time data;
  determining by the real-time data aggregation component, a time of a last update to the real-time data;
  obtaining, by the real-time data aggregation component, a difference between the time of the last update to the real-time data, and the time of the last request for the real-time data; and
  in the event the difference between the time of the last update to the real-time data and the time of the last request for the real-time data exceeds a predetermined threshold value, sending, by the real-time data aggregation component, the subscription stop message to the first telecommunications system or device.

* * * * *